J. G. Clark.
Cotton Planter.
No. 2,517. Fig: 1. Reissued Mar. 19, 1867.
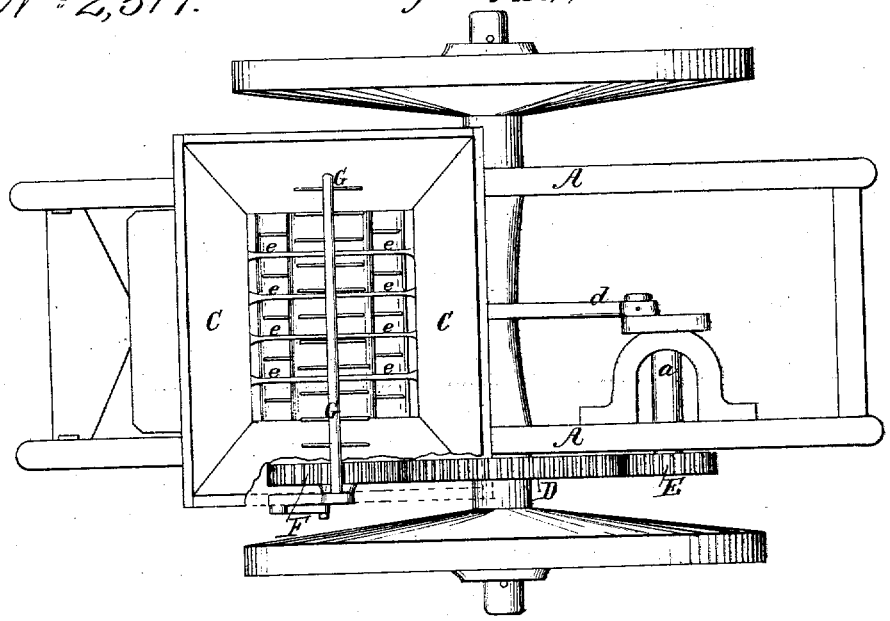
Fig: 3.
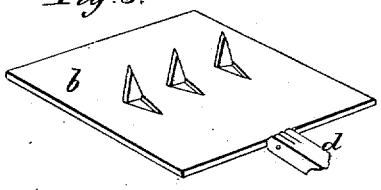
Fig: 2.
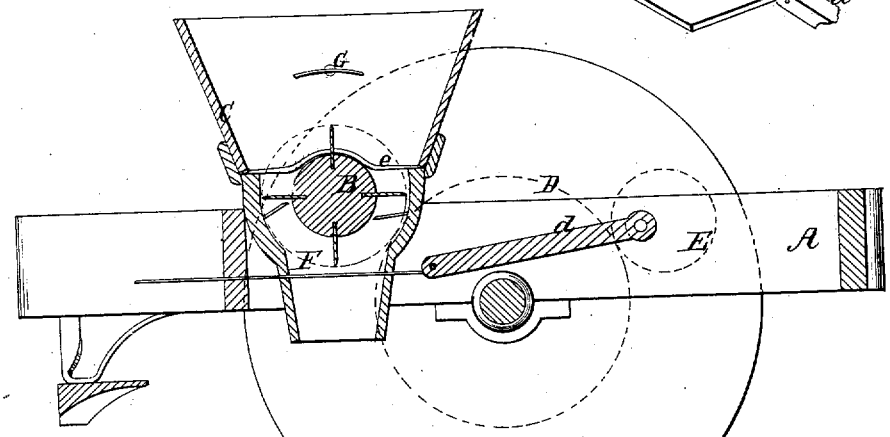
Witnesses;
David Mumma
Wm. M. Harnish
Inventor;
John G. Clark
N. PETERS, PHOTO-LITHOGRAPHER, WASHINGTON, D. C.

UNITED STATES PATENT OFFICE.

JOHN G. CLARK, OF MIDDLETOWN, OHIO.

IMPROVEMENT IN MACHINES FOR PLANTING.

Specification forming part of Letters Patent No. 58,381, dated October 2, 1866; Reissue No. 2,517, dated March 19, 1867.

*To all whom it may concern:*

Be it known that I, JOHN G. CLARK, of Middletown, in Butler county, in the State of Ohio, have invented a new and useful Improvement in Machines for Planting Cotton-Seeds; and I do hereby declare that the following is a full and exact description thereof, reference being had to the accompanying drawings, and to the letters of reference marked thereon.

Figure I represents a top view of my machine, with a part of the hopper broken away to exhibit the gearing and the agitator-crank and pitman. Fig. II is a vertical longitudinal section of the same, showing the feeding-roll, fixed teeth, and perforated slide, with the hopper and its ribs above the toothed feed-roll. Fig. III represents the toothed reciprocating slide detached.

Machines for planting corn and other kinds of grain have been found impracticable for planting cotton-seeds, because a mass of cotton-seeds, when placed in the hopper of such machines, will not freely separate, but adhere, on account of their fibrous condition. In order to properly separate the adhering mass, a machine for planting cotton-seeds must be provided with suitable mechanism for breaking up the compact mass, and for discharging the seeds with regularity. To remedy the practical difficulties referred to, I have employed, among other improvements, stationary teeth in the hopper, so arranged in relation to a revolving toothed cylinder as to serve as a fixed comb or rake, which shall prevent the mass of seeds from being crowded toward the bottom of the hopper, and also to cause a limited number of seeds to fall down from the mass, which may be brought up from the bottom of the hopper by the teeth of the revolving cylinder.

Another feature of my invention consists in the employment of an agitator arranged centrally in the hopper, and actuated through the medium of the gearing, as will be fully described herein.

To enable others to make and use my invention, I will describe it with reference to the accompanying drawings, which are made a part of this specification.

The machine is supported and carried upon the two wheels A A. The gearing, hopper, and operating mechanism rest upon a suitable frame, A′ A′, connected with the main axle.

B indicates the toothed cylinder, arranged in the lower portion of the hopper C. The gear-wheel D on the axle meshes into the pinion E, and the latter operates the crank-shaft *a*, causing the slide *b* to reciprocate by means of the pitman *d*, which is connected with both the slide *b* and crank on shaft *a*. The wheel D also meshes into the pinion F on the end of the journal of cylinder B.

Across the center of the hopper C is a shaft, G, provided with two sets of teeth, and at the gearing side of the machine the agitator-shaft G is provided with a crank, which is connected by a pitman with a crank-pin on the outer face of gear-pinion F. The hopper C is also furnished with curved ribs or slats *e e*, which extend across it, over the toothed cylinder B, and the latter is provided with four rows of teeth of five in each row. These teeth pass between the ribs *e e* as the cylinder B, to which they are connected, revolves, and also pass between the stationary teeth, extending inwardly from the sides of the hopper near its bottom. The lower part of the hopper may be concave. The stationary teeth in the sides of the hopper are arranged tangential to the cylinder, so as to point toward the moving mass of seeds, which may be carried around by the toothed cylinder B. The wheels which carry the machine are permanently secured to the main axle, and the latter is therefore caused to revolve with the former. The large gear-wheel D actuates the pinion E on shaft *a*, which communicates motion to the reciprocating perforated slide *b*, causing it to move back and forth horizontally at the bottom of the hopper C. The wheel D also actuates the rock-shaft G through gear-wheel F and the pitman connecting this wheel with a crank on the end of the agitator-shaft G. Pinion F being on the end of the journal of the toothed cylinder B, gives it a revolving movement.

It will be observed from the foregoing description that my machine embraces devices which not only act positively upon the seeds to feed them forward to the discharge-openings, but, by means of the ribs *e e* and stationary teeth, a portion of the seeds are retarded or held back, which operations effect a separation of the mass of seeds, and cause a regular discharge of them from the hopper.

The agitator-shaft G may be provided with but one set of arms, which, instead of projecting from its side, may be connected to the under side of the shaft. When so arranged, the agitator will serve to raise up and open out the mass of seeds in the hopper. The ribs *e e* will retain the greater body of seeds above the cylinder, the teeth of which, working between the ribs as the cylinder revolves, will draw a portion of the seeds below, where they may be discharged through the openings in the reciprocating slide *b*. The slide *b* may be made with teeth projecting upwardly, or plain, with suitable discharge-openings, as represented at *b* in Fig. II. The teeth, however, will be found greatly advantageous in planting seeds when in a damp or compact condition, as they assist in such a case to regulate the discharge.

When the seeds are in the condition above described or very fibrous, the ribs *e e* may be dispensed with or a less number used; also, more or less of the fixed teeth of the hopper may be employed.

In constructing a working-machine the ribs and teeth may be attached with nuts and screws, so as to be readily removed. The teeth upon the reciprocating slide may be connected in like manner, or two slides, one with and one without teeth, may be provided, so as to be readily substituted for each other, as the character of the work to be performed may indicate. This manner of attaching the parts of the machine I do not claim, being a mode long in use.

The toothed slide may be made of sheet, metal with portions cut angularly and bent up, as represented in Fig. III. This is a cheap mode of construction, and provides the necessary holes for the seeds to drop through. The seeds to be planted are placed in the hopper C and subjected first to the action of the agitator; then they are drawn down by the teeth of the cylinder in small quantities, and finally discharged through openings in the slide *b*. The fixed teeth in the hopper, which point upward at an angle to a horizontal line, serve to prevent clusters of seeds from being drawn down without being separated from each other; and in case there is an accumulation of seeds at the bottom of the hopper sufficient to impede the free discharge to the ground, then the teeth of the cylinder will carry the mass upward and force a portion of them between the stationary teeth, (in the hopper,) which point downward at an angle of about thirty degrees to a horizontal line, and these teeth will comb out and separate some seeds during this part of the operation.

It is evident that the gearing may be so varied as to give to the moving devices any necessary degree of speed to effectually separate the seeds and discharge them with regularity, whatever the condition of the seeds may be.

In planting some qualities of seeds the action of the agitator may be dispensed with, or the extent of its movement may be varied. The agitator, as will be seen, has a reciprocating motion in the arc of a circle. It is apparent that two reciprocating slides may be used instead of one by simply employing a double crank to actuate them. As the seeds pass through the perforated slide they will fall into the conductor-hose, which conducts them into the soil, and the V-shaped concave block *x*, attached to the rear end of the frame, will remove obstructions and clods outwardly on each side of the furrow and above a regular plane, which it sweeps with its angular edges or sides, and by its inclined concave bottom the block *x* will gather and compress the soil over and upon the seeds as the machine progresses, thus covering them a regular and uniform depth.

Having fully described my improvements in machines for planting cotton-seeds, what I claim, and desire to secure by Letters Patent, is—

1. The toothed cylinder B, in combination with a toothed reciprocating slide or slides, constructed, arranged, and operating substantially as described.

2. The arrangement of the agitator in the hopper C above the toothed cylinder, operated by mechanism substantially as described.

3. The combination of actuating-gearing with the perforated slide *b*, arranged to operate at the bottom of the hopper conjointly with the cylinder B, to regulate the discharge of the seeds, substantially as specified.

4. The stationary teeth arranged tangentially in relation to the cylinder and ribs *e e*, in combination with the positively-operating devices for separating the seeds, substantially as described.

Witness my hand this 5th day of December, 1866.

J. G. CLARK.

Witnesses:
H. P. K. PECK,
A. L. PECK.